Nov. 6, 1945. G. B. PHILIPS ET AL 2,388,570

SHAFT BEARING

Filed April 22, 1944 2 Sheets-Sheet 2

INVENTORS
George B. Philips
James R. Tuuri
by their attorneys
Christy, Parmelee & Strickland Patented Nov. 6, 1945

2,388,570

UNITED STATES PATENT OFFICE 2,388,570

SHAFT BEARING

George B. Philips, Glenshaw, Pa., and James R. Tuuri, Fairport Harbor, Ohio, assignors to Blaw-Knox Company, Blawnox, Pa., a corporation of New Jersey Application April 22, 1944, Serial No. 532,242

9 Claims. (Cl. 308—187.1)

This invention is for a shaft bearing and seal, and relates particularly to a bearing for use with an agitator shaft in a reactor used for effecting chemical processes wherein the equipment may be subjected to wide variations in temperature and at the same time be subjected to pressures considerably above atmospheric pressure.

The invention is especially designed for use in a reactor of the type wherein there is a cylindrical shell which may be several feet long. For example the reactor may be of the order of 18 feet in length or more. An agitator extends throughout the length of the vessel or shell, being provided throughout the greater portion of its length with agitating means for keeping the contents of the vessel continuously in a state of agitation during the time that the apparatus is in operation. There is a head at each end of this vessel and the agitator shaft is supported in a bearing in each head. The shaft extends beyond both ends of the head. Since the invention is especially designed for use in such an agitator, it will be described primarily in connection with an apparatus of this kind, but it is to be understood that this is merely by way of illustration and that the shaft bearing is applicable for use in other environments and with other types of equipment than the one hereinafter specifically described.

In apparatus of the character above mentioned, finely divided solid material, as for example a catalytic material, is continuously agitated while fluids, as for example gases, are introduced into the reactor and polymerization or other reactions are effected. In carrying out reactions of this kind, the temperature conditions may vary considerably. For example if the apparatus is used in a batch process, it may be necessary to first apply heat to the reactor to initiate the reaction. After the reaction starts, it may proceed exothermically until relatively high temperatures are reached inside the reactor and then it may be necessary to cool the contents of the reactor to prevent the reaction from proceeding too far or avoid the production of undesired or less desirable end products. The pressures built up in the reactor may be of the order of several hundred pounds per square inch, and it is highly important that the fluids within the reactor shall not escape to the atmosphere.

Under conditions of operation such as those above outlined, with a shaft which is many feet in length, there may be considerable relative movement between the casing and the shaft in an endwise direction due to thermal expansion and contraction and any bearing must not only provide an effective seal against the rotation of this shaft relative to the vessel in which it is mounted, but it must also provide an effective seal against such relative longitudinal or axial movement.

The present invention provides in a bearing structure for agitators of this kind and for other equipment an arrangement whereby one packing provides a seal against relative longitudinal or axial movement while another packing forms a seal against rotational movement. The invention further provides a construction wherein the bearing assembly, except for the agitator shaft, can be set up in the factory where the equipment is built so that in the erection of the equipment in the field the bearing itself, which must be carefully installed, will have been completely fitted and operations in the field require only the agitator shaft need be inserted without disturbing the bearing or the bearing seals. These results are accomplished through the use of an intermediate sleeve mounted in the head or end member of the reactor and concentric with the agitator shaft, one of the seals being provided between the sleeve and head in which it is mounted and the other seal being provided between the sleeve and the shaft.

While the foregoing description of the apparatus indicates that the apparatus may be a batch type of apparatus, the invention is also applicable for use with a reactor designed for continuously effecting reactions of this kind as illustrated for example in the co-pending application of Samuel T. Russell and Harold A. Ohlgren, Serial No. 545,068, filed July 15, 1944, wherein the bearing is also illustrated.

Our invention may be more fully understood by reference to the accompanying drawings, in which:

Fig. 3 is a fragmentary detail view of one of the packing elements about the sleeve, the view being a longitudinal section on a larger scale than Fig. 2.

Figure 1:
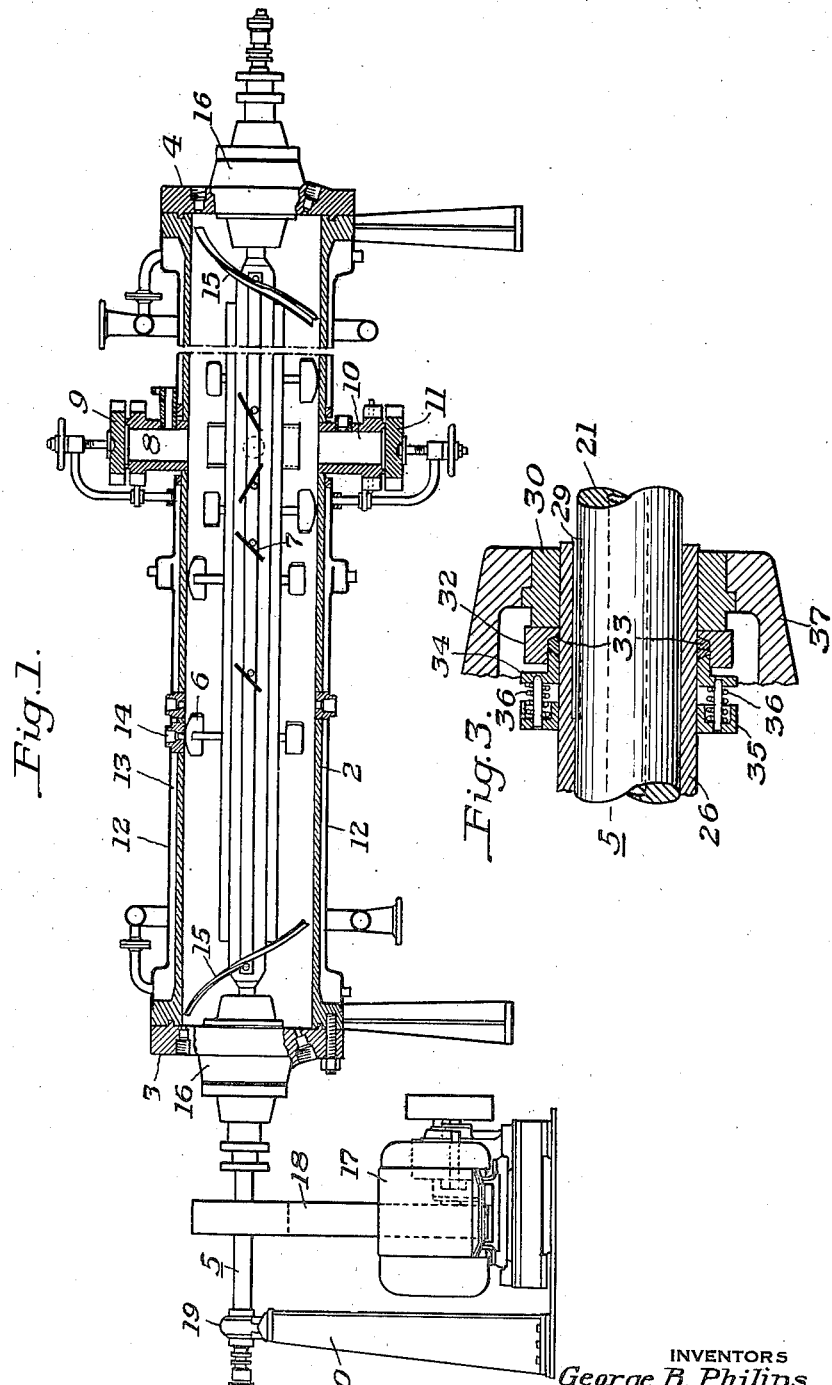
Fig. 1 is a more or less schematic view illustrating a reactor of the type to which the present invention is applicable with the bearing structure being shown in elevation at each end of the reactor, the reactor being shown in longitudinal section.

Referring first to Fig. 1, 2 designates the shell of a reactor, this shell being generally cylindrical in form and being ordinarily many feet in length.

At each end of the shell is a closure or head member, the head member at one end being designated 3 and at the other end being designated 4. Extending lengthwise of the reactor, and projecting through the ends thereof, is a shaft designated generally as 5. Within the reactor the shaft carries a series of long paddles or agitating elements 6 and a series of short paddles or agitating elements 7, the blades of both series of paddles being inclined to the longitudinal axis of the shaft, the inclination of the blades of the short paddles being the reverse of those of the long paddles, and the blades of the long and short paddles to one side of the longitudinal center area reversed in respect to their inclination from those at the other side of the longitudinal center. At approximately the longitudinal center of the shell there is a charging opening 8 having a removable flanged cover 9, the opening 8 being at the top of the reactor. Directly below the charging opening 8 is a discharge opening 10 having a removable flanged cover 11. The exterior of the shell or casing is surrounded by a spaced jacket or casing 12 so as to provide a circulating space 13 through which fluid for heating or cooling the reactor may be circulated. Provision is made for introducing fluids to the interior of the reactor through connections as indicated for example at 14, and at intervals along the length of the vessel are other connections into which thermostats or other temperature or pressure-responsive instruments may be connected.

In operation dry powdered material is charged into the reactor by opening the cover 9 over the inlet opening 8. The cover 9 is then fastened down, air is exhausted through means not shown, the agitator is put into operation by rotation of the shaft 5, and the fluids are introduced into the reactor. The long paddles tend to propel the material away from the center toward the ends while the short blades tend to move the material from the ends toward the center. At each end of the shaft is shown a screw or spiral blade 15, the two blades being reversed for directing the material in the chamber away from the respective heads 3 and 4.

The shaft is supported in the bearings which are designated generally as 16, there being one of these bearings in each head of the reactor. For driving the shaft there has been illustrated a motor 17 which drives a belt 18 through an appropriate reduction gearing, the belt passing over a pulley on the shaft 5. There is an end thrust bearing carried in a pillow block 19 on a support 20 at one end of the shaft 5.

Except for the construction of the bearing 16, all of the apparatus hereinbefore described forms no part of the present invention per se, and is known to those skilled in the art and has been described in detail only for the purpose of illustrating the nature of the present invention and the conditions which it is required to meet.

Figure 2:
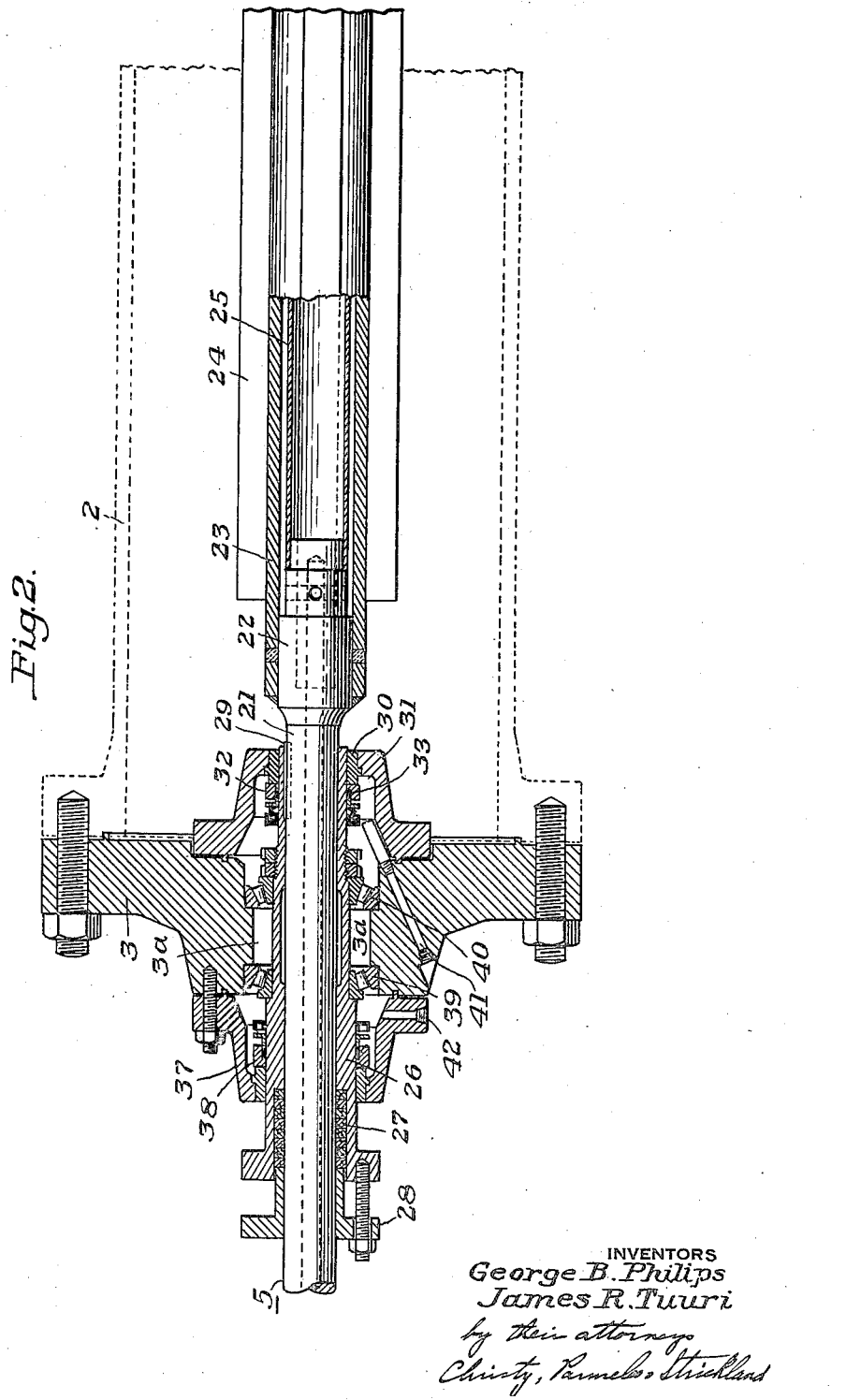
Fig. 2 is a longitudinal section on a larger scale through the bearing itself.

Also as indicated in Fig. 1, and as more clearly shown in Fig. 2, the shaft 5 is of a hollow construction so that cooling or heating fluid can be circulated therethrough, as may be required. The shaft 5 comprises an end section 21 which passes through the bearing and which has an enlargement 22 on its inner end to which is secured a sleeve 23 carrying ribs 24 thereon to which the paddles are secured. A tube 25 is concentrically arranged within the sleeve 23 and is secured to the reduced inner end portion of the shaft 21. The shaft 21 has a longitudinally extending bore therethrough to enable fluid to be circulated from the exterior of the structure into the tube 25, and also into the space around the tube 25.

For the purpose of describing the present invention, the bearing at only one end of the reactor is shown in detail, the bearing at the other end of the reactor being of the same construction. According to the present invention there is provided about the shaft 21 a sleeve 26 in which the shaft 21 has a sliding fit. At the outer end of the sleeve 26 is a recess or stuffing box for receiving packing material 27. A gland 28 about the outer end of the shaft cooperates with the packing in the recess 27 to provide a conventional gland or stuffing box type of packing between the shaft and the sleeve. The shaft 21 is keyed to the sleeve 26 by a longitudinally extending key 29, the key 29 being a flat longitudinally extending key which permits of the longitudinal movement of the shaft 21 relative to the sleeve 26 but which transmits rotational movement of the shaft to the sleeve.

Surrounding the sleeve 26 is a combined bearing and seal of the type more fully described and claimed in the co-pending application of George E. Kopetz, Serial No. 451,703, filed July 21, 1942. This bearing includes a gland insert ring 30 mounted in a cover member 31 that is bolted or otherwise secured to the inside of the head or end member for the reactor, which in Fig. 2 is designated 3. Inside the cover (see Fig. 3) is a sealing ring 32 which rotates with the shaft and which bears against the insert ring 30. Within the sealing ring 32 is a packing 33, the ring 32 forming a stuffing box to receive this packing. Slidably fixed on the sleeve for rotation therewith is a compression ring 34. Fixed on the sleeve above the compression ring 34 is a compression collar 35. Coil springs 36 interposed between the collar 35 and the compression ring 34 serves to urge the compressing ring into the stuffing box to keep the packing continuously tight.

On the outside of the head 3 is a second cover member 37, and there is a gland assembly 38 which is similar to the one just described, being comprised of identical parts faced in the opposite direction.

The head 3 has a central passageway 3a therethrough through which the sleeve passes and at 39 and 40 are bearings positioned in this passageway, these bearings being roller bearings and serving to rotatably support the sleeve in the head.

The opening 3a, together with the cover members 31 and 37 forms a lubricant receiving chamber. A passageway 41 tapped to receive a pipe not shown enables lubricant to be introduced into this chamber. A second tapped opening 42 provides for the removal of the lubricant from the chamber. As described in the aforesaid Kopetz application, lubricant is maintained under pressure in the chamber around the bearings and around the stuffing boxes, this lubricant preferably being maintained at a pressure approximating, or even exceeding the pressure encountered in the reactor so that if there is any tendency toward leakage in the stuffing box, the lubricant will leak into the reactor rather than allowing the contents of the reactor to escape to atmosphere.

While the type of bearing disclosed in the Kopetz application has been specifically described for sealing and rotatably supporting the sleeve in the head, it will be understood that any other appropriate bearing may be employed.

From the foregoing, it will be seen that one packing provided by the gland or stuffing box 27—28 forms a seal between the shaft and the sleeve which has to seal only against endwise relative movement because of the fact that the sleeve and the shaft are keyed to rotate together. On the other hand, the second packing means formed between the cover elements 31 and 37 and the sleeve are not subject to any endwise movement of the parts and need to be kept tight only against relative rotational movement. No matter how tightly the stuffing box 27—28 may be set up, it will not increase the friction against which the shaft must rotate. On the other hand, since the bearings between the sleeve and the cover element have to be tight only against such fluids as tend to escape due to relative rotation, they are not sufficiently tight to seriously impede the travel of the agitator. This is particularly true where a counterpressure lubricant is maintained inside the bearing to resist the outward flow of fluids from the reactor.

It will also be seen that the sleeves 26 are relatively short. Each sleeve can be accurately mounted in the head member in which it is carried in the factory in which the reactor is built. Any delicate adjustments that have to be made can be made in the factory and the head element along with the sleeve can be shipped as one assembly. The agitator shaft can be inserted in the sleeve in the field when the reactor is being assembled, and without requiring that the sleeve and the bearings and packing be disturbed in any way.

While I have illustrated and described one specific construction of packing and one particular application of the packing to use with a particular form of reactor, it will be understood that these are merely illustrative of the invention, and that the invention is not limited to the particular construction shown, nor to use with the particular apparatus with which it is specifically described.

We claim as our invention:

1. For use about a shaft within a casing where variable conditions of temperature and pressure are encountered, which variations of temperature create relative axial movement between the casing and the shaft due to thermal expansion and contraction, the invention herein described comprising a bearing structure and seal supported in the casing about the shaft comprising a sleeve element concentrically arranged about the shaft, a fluid-tight seal between the shaft and the sleeve and a second fluid-tight seal between the sleeve and the casing comprising two spaced oppositely faced sealing elements, and bearings for supporting the sleeve and shaft in the casing, said bearings being enclosed between said oppositely faced sealing elements the sleeve being keyed to the shaft for rotation therewith.

2. For use about a shaft within a casing where variable conditions of pressure and temperature are encountered, the variations of temperature tending to create relative axial movement between the shaft and the casing due to thermal expansion and contraction, the invention herein described comprising a bearing and seal structure supported in the casing about the shaft, said structure comprising a sleeve element fitted about and keyed to the shaft for rotation therewith, a fluid-tight seal between the shaft and the sleeve, spaced packing elements in the casing about the sleeve, and bearings in the casing between said spaced packing elements.

3. For use about a shaft within a casing where variable conditions of pressure and temperature are encountered, the variations of temperature tending to create relative axial movement between the shaft and the casing due to thermal expansion and contraction, the invention herein described comprising a bearing and seal structure supported in the casing about the shaft, said bearing structure and seal comprising a sleeve element fitted about and keyed to the shaft for rotation therewith, a fluid-tight seal between the shaft and the sleeve, spaced packing elements in the casing about the sleeve, and bearings in the casing between said spaced packing elements, a portion of the casing in conjunction with said spaced packing elements providing an enclosed fluid-tight chamber in which said bearings are located for retaining and holding lubricant.

4. A fluid-tight bearing structure for a shaft which is to be rotated and which is also subject to axial movement comprising a sleeve element, a packing between the sleeve element and the shaft to seal the bearing against axial movement, a packing around the sleeve to provide a seal around the outside of the sleeve, and means connecting the shaft and the sleeve against relative rotational movement but permitting relative longitudinal movement.

5. A fluid-tight bearing structure for a shaft which is to be rotated and which is also subject to axial movement, said bearing structure comprising a sleeve element fitted about the shaft and keyed to the shaft, a bearing on the sleeve, a structure in which the bearing is mounted, a packing gland on the sleeve at each side of said bearing forming a seal between the bearing and the supporting structure, and a packing gland at one end of the sleeve about the shaft.

6. A bearing assembly of the class described comprising a supporting head, a sleeve passing through the supporting head, a bearing rotatably supporting the sleeve in the supporting head, a gland in the supporting head on the sleeve at each side of the bearing, a shaft slidable through the sleeve, and a gland in the sleeve about the shaft.

7. A bearing structure of the class described comprising a supporting head having an opening therethrough, a sleeve passing through the opening, a cover member on the inner face of the supporting member on the supporting sleeve, a second cover member about the sleeve on the other face of the supporting member, a packing gland forming a fluid-tight seal between each cover member and the sleeve, a bearing structure around the sleeve inside the supporting head, the sleeve being adapted to receive a shaft, and a gland at one end of the sleeve for forming a seal between the sleeve and the shaft, and means for connecting the shaft with the sleeve.

8. In an agitator assembly of the class described, a bearing structure comprising a supporting head having a passageway therethrough, an agitator shaft passing through the supporting head, a sleeve fitted about the agitator shaft, a key connecting the agitator shaft and the sleeve, a gland in the sleeve about the agitator shaft forming a fluid-tight seal, a pair of glands around the sleeve, a cover member associated with each of said glands around the sleeve and secured to the supporting head, a bearing for the sleeve in the supporting head between the two glands on the sleeve, there being a lubricant-receiving space in the supporting head between the two cover members and around the sleeve, and a connection through which oil may be supplied to said space.

9. In an agitator assembly of the class described, a bearing structure comprising a supporting head having a passageway therethrough, an agitator shaft passing through the supporting head, a sleeve fitted about the agitator shaft, a key connecting the agitator shaft and the sleeve, a gland in the sleeve about the agitator shaft forming a fluid-tight seal, a pair of glands around the sleeve, cover members associated with each of said glands of said pair and secured to the supporting head, a bearing for the sleeve in the supporting head between the two glands on the sleeve, there being a lubricant-receiving space in the supporting head between the two cover members and around the sleeve, a connection through which oil may be supplied to said space, and another connection remote from the first through which oil may be withdrawn from the said space.

GEORGE B. PHILIPS.
JAMES R. TUURI.